United States Patent
Al-Banna et al.

(10) Patent No.: US 8,136,141 B2
(45) Date of Patent: Mar. 13, 2012

(54) METHOD AND SYSTEM FOR ALLOCATING BANDWIDTH BASED ON TRANSMISSION POWER OF DEVICES TRANSMITTING OVER COMMUNICATION CHANNELS IN A NETWORK

(75) Inventors: Ayham Al-Banna, Darien, IL (US); Tom Cloonan, Lisle, IL (US)

(73) Assignee: ARRIS Group, Inc., Suwanee, GA (US)

( * ) Notice: Subject to any disclaimer, the term of this patent is extended or adjusted under 35 U.S.C. 154(b) by 534 days.

(21) Appl. No.: 12/258,661

(22) Filed: Oct. 27, 2008

(65) Prior Publication Data

US 2009/0113503 A1 Apr. 30, 2009

Related U.S. Application Data

(60) Provisional application No. 60/982,936, filed on Oct. 26, 2007.

(51) Int. Cl.
*H04N 7/173* (2011.01)
*H04J 1/16* (2006.01)

(52) U.S. Cl. .................... 725/111; 725/121; 370/252

(58) Field of Classification Search ............... 725/111, 725/121, 122, 125, 126; 370/252
See application file for complete search history.

(56) References Cited

U.S. PATENT DOCUMENTS

| | | | | |
|---|---|---|---|---|
| 7,002,899 | B2 * | 2/2006 | Azenkot et al. | 370/208 |
| 7,751,338 | B2 * | 7/2010 | Azenko et al. | 370/252 |
| 2006/0117363 | A1 * | 6/2006 | Lee et al. | 725/106 |

* cited by examiner

*Primary Examiner* — Hunter Lonsberry
(74) *Attorney, Agent, or Firm* — Troy A. Van Aacken; Robert J. Starr

(57) ABSTRACT

A method performed by a central network device, such as a network edge device, or a CMTS, determines whether some of a plurality of user devices coupled to a communication device are transmitting at substantially their respective maximum power output level over a given channel. If the central device determines that some of the devices are operating at near their maximum output level ("power pegged,) the central device searches for another channel that can carry the traffic of the power pegged devices at reduced data rate. If another channel can accommodate transmission of signals of the power pegged device, the central device instructs the power pegged devices to tune to the new channel at a reduced data rate compared to the data rate of the current channel.

24 Claims, 2 Drawing Sheets

METHOD AND SYSTEM FOR ALLOCATING BANDWIDTH BASED ON TRANSMISSION POWER OF DEVICES TRANSMITTING OVER COMMUNICATION CHANNELS IN A NETWORK

CROSS REFERENCE TO RELATED APPLICATION

This application claims priority under 35 U.S.C. 119(e) to U.S. provisional patent application No. 60/982,936 entitled "Transmit-power-based load balancing," which was filed Oct. 26, 2007, and is incorporated herein by reference in its entirety.

TECHNICAL FIELD

The claimed subject matter relates to communications networks, and more particularly, to using the transmission power of each of a plurality user devices over channels of a network to determine which of a plurality of channels the devices should transmit over.

BACKGROUND

As FIG. 1 illustrates, the path between the Cable Modem Termination System (CMTS) and the Cable Modem (CM) has many attenuation points. The CM needs to transmit enough power such that the signal hits the CMTS at a specific desired power level. The CMTS asks the CM during the ranging process (and station maintenance) to adjust (increase or decrease) its transmitted power so that the received power at the input of the CMTS is equal to the desired value (0 dBmV in FIG. 1).

If the attenuation between the CMTS and CM increases, the CM is asked to transmit more power to keep the received power at the input of the CMTS at the desired level. As more and more attenuation is added on the HFC link (e.g., user puts more splitters inside home), the CM may not be able to transmit enough power to provide a desired received power value at the input of the CMTS (because of its limited power transmission capabilities). These particular modems, which are producing the maximum power output they are capable of and deliver an upstream signal to the input of the CMTS in which the power of the upstream signal at the CMTS is less than the desired received power level may be herein referred to as 'power-pegged modems.' This term implies that the transmit power level at the modem is pegged to the modem's maximum output power level. Since the signal power arriving at the CMTS from these power-pegged modems is undesirably low, the ability to receive and demodulate those signals can oftentimes be impaired. Oftentimes, the characteristics of the channel can be modified via modulation profile changes (ex: lower symbol rates, lower-order QAM, etc.) to make it easier to receive and demodulate the arriving low-power signals from the power-pegged modems, but these modified characteristics typically result in a lower bit-rate for all of the modems on the channel. In other words, the non-power-pegged modems are being penalized in their bit-rates because of the existence of power-pegged modems sharing their upstream channel. On typical upstream channels, most of the modems on the channel will not be power-pegged, so the penalties will unfortunately be felt by a large percentage of the modems (which are not power-pegged).

Since the Multiple System Operator (MSO) is required to provide an adequate service to all CMs connected to a CMTS, a modulation profile must be assigned to a particular upstream channel such that all CMs can communicate signals reliably using that modulation profile. The unfortunate case happens when a very small number of CMs on a certain upstream channel are power-pegged, which results in a low-bit-rate modulation profile assigned to that upstream channel by the CMTS. All modems on that upstream channel will unfortunately be penalized and forced to use the low-rate modulation profile for transmission even though most of those modems are non-power-pegged modems and would work with higher-rate modulation profiles. MSOs normally use the low-rate modulation profile approach to solve the problems that occur whenever a few modems on an upstream channel are power-pegged.

Assigning low-rate modulation profiles to upstream channels, where most of the modems are not power-pegged, results in inefficient use of the channel capacity. We propose in this document a solution to this problem.

SUMMARY

We propose to use a novel load-balancing technique based on the modems transmitted power values. When a predetermined percentage of modems on a certain upstream channel, either a (physical or a logical channel,) are power-pegged, these modems must be moved to another physical or logical upstream channel. The new upstream channel should have characteristics (narrower width, lower-order modulation profile, specific communications technology) that will permit the power-pegged modems to operate with satisfactory results. The process of moving/tuning the modems from one upstream (physical or logical) to another based on the modems transmitted power is called transmit power load balancing. This type of load balancing enables the MSO to increase the capacity of the 'old', or previous, upstream channel after removing transmissions from power-pegged modems therefrom, because most of the remaining modems on that channel can transmit enough power to operate at high data rates.

Thus, moving power-pegged modems out of upstream channels where most modems are not power-pegged, followed by parameter-optimization for that old upstream channel results in efficient use of the upstream spectrum and a higher capacity system. Transmit power load balancing is also useful in reducing the number of bonded upstream channels required to provide high upstream data rates.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
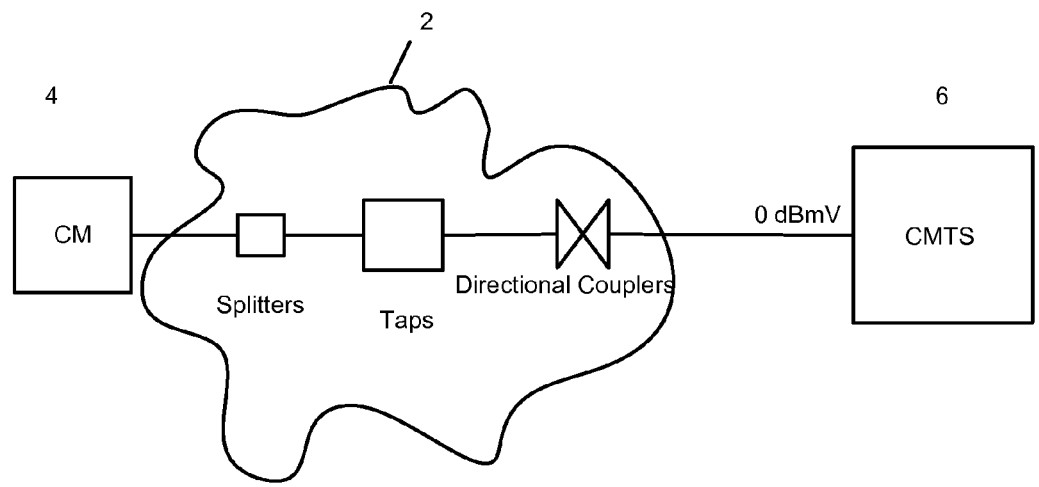
FIG. 1 illustrates an upstream transmission path in a communication network.
Figure 2:
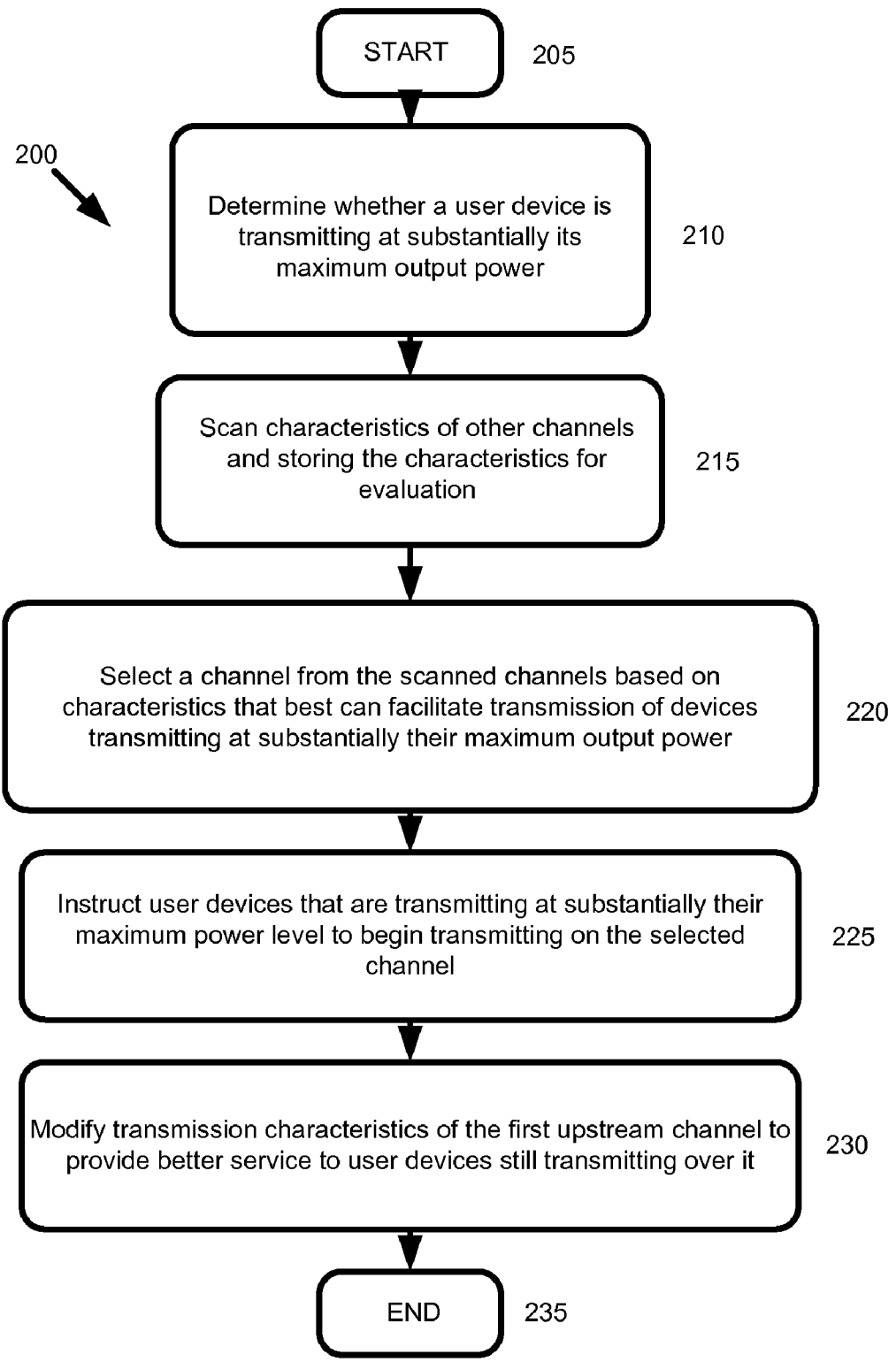
FIG. 2 illustrates a flow diagram of a method for assigning upstream transmissions to channels based on the output headroom of transmitting devices.

Returning now to the figures, FIG. 2 illustrates a flow diagram of a method 200 for assigning the upstream frequencies that a plurality of user devices use in transmitting upstream transmissions over a communication network, such as the network 2 shown in FIG. 1. Method 200 starts at step 205 and at step 210, the method determines whether any of the user devices, such as cable modems, are transmitting at substantially the maximum output power, such that they have no headroom to accommodate an increase in output power. At network edge device may perform step 210 by sending a request message to the user devices to return a message indicating that they are at, or substantially at, their maximum transmit output power level. If the edge device determines that one, or more, of the devices are transmitting at substantially their maximum output level, the edge device scans other channels at step 215 to determine if other channels may have unused bandwidth capacity. If the edge device determines at step 215 that other channels may have unused bandwidth capacity, the edge device evaluates scanned channels to determine if the channels with available bandwidth capacity can be used to transmit signals from the one, or more, devices currently transmitting at, or substantially at, their maximum output. A factor the edge device considers is whether the upstream channels with available capacity can accommodate the currently power pegged devices without adversely affecting transmission of devices that are currently using the channel under evaluation.

If the edge device determines that one, or more, channels exist with available capacity that can accommodate transmissions from the power pegged devices, the edge device selects at step 220 the best of the channels that can accommodate the power pegged device to transmit signals from the power pegged devices.

At step 225, the edge device instructs the power pegged user devices to tune to the selected channel and begin transmitting over it. At step 230, edge device modifies transmission over the first, or original, channel to maximize transmission performance over it. Method 200 ends at step. 235.

Figure 3:
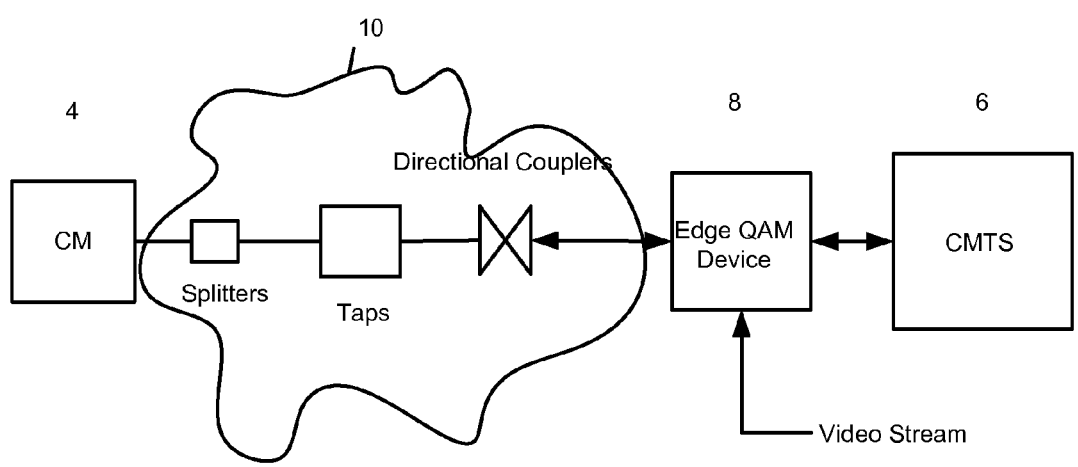
FIG. 3 illustrates an upstream transmission path in a communication network having an edge device located between a central device and the network.

The description above discusses an edge device. A CMTS, as shown in FIG. 1, may perform the function of an edge device. Or, and edge device may be a device located logically between a CMTS, and a user device, such as a cable modem. Alternatively, edge device functionality and CMTS functionality can be combined in the same device and may process signals received at the same port on an HFC. The Edge device performs certain aggregating functions, such as mixing traffic to and from a CMTS with MPEG video streams from a video server or antenna farm. Thus, with respect to the description of the method 200 shown in FIG. 2, a CMTS, an edge device, or a combination edge and CMTS device may perform the steps, regardless of whether the devices performing the functionality are located physically in the same equipment rack, or remotely from one another. FIG. 3 illustrates an edge QAM device 8 located between CMTS 6 and hybrid fiber coaxial network ("HFC") 10. Thus, edge QAM device 8, or CMTS 6 could perform the steps of method 200 described above in connection with method 200.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method of tuning user devices from a first upstream channel to another upstream channel based on each of the devices transmit power levels, comprising:
    establishing connection and registration with user devices on a first upstream channel;
    determining whether each of the user devices previously connected and registered is transmitting on the first upstream channel at a power level substantially equal to its maximum output power level;
    scanning transmission characteristics of at least one other upstream channel;
    selecting from the at least one other scanned upstream channels a second upstream channel that can accommodate upstream transmissions from the devices determined to be operating at substantially their respective maximum output power without adversely affecting upstream transmissions from user devices that are not operating at substantially their maximum output power level;
    instructing the user devices that are transmitting upstream at substantially their maximum output power level to begin transmitting upstream on the second upstream channel; and
    modifying transmission characteristics of the first upstream channel to provide better service to user devices still transmitting over it.

2. The method of claim 1 wherein the characteristics of an upstream channel include the channel width, modulation profile, and communications technology.

3. The method of claim 1 wherein the upstream channels considered in the scanning processes can be logical channels at same frequency of the first channel or physical channels at different frequency from that of the first channel.

4. The method of claim 1 wherein the measure of user devices transmitting power at the maximum limits is measured dynamically.

5. The method of claim 1 wherein the measure of user devices transmitting power at the maximum limits of measured per upstream channel.

6. The method of claim 1 wherein the better service can be higher throughput.

7. The method of claim 1 wherein the network-edge system is a Cable Modem Termination System.

8. The method of claim 1 wherein the user device is a Multimedia Terminal Adaptor or a Cable Modem.

9. A method of operating a communications system that consists of a network-edge device coupled to a plurality of user devices, wherein a set of the user devices are transmitting at substantially their respective maximum transmit power, the method comprising:
    establishing connection and registration with devices on a first upstream channel;
    determining whether each of the user devices is transmitting on the first upstream channel at a power level substantially its maximum output power level;

measuring the received signal power of user devices transmitting at substantially their maximum output power level at the network-edge device;
scanning the characteristics of at least one other upstream channel;
selecting from the at least one other scanned upstream channels a second upstream channel that can accommodate upstream transmissions from the devices determined to be operating at substantially their respective maximum output power without adversely affecting upstream transmissions from user devices that are not operating at substantially their maximum output power level;
sending a channel change request from the network-edge device to user devices that are transmitting at a power level substantially their respective maximum upstream transmit power level that instructs the devices to tuning to the second upstream channel;
modifying transmission characteristics of the first upstream channel to provide better service to user devices still transmitting over it.

10. The method of claim 9 wherein the characteristics of an upstream channel includes the channel width, modulation profile and communications technology.

11. The method of claim 9 wherein the upstream channels considered in the scanning processes can be logical channels at same frequency of the first channel or physical channels at different frequency from that of the first channel.

12. The method of claim 9 wherein the measure of user devices transmitting power at the maximum limits is measured dynamically.

13. The method of claim 9 wherein the measure of user devices transmitting power at the maximum limits of measured per upstream channel.

14. The method of claim 9 wherein the better service can be higher throughput.

15. The method of claim 9 wherein the network-edge system is a Cable Modem Termination System.

16. The method of claim 9 wherein the user device is a Multimedia Terminal Adaptor or a Cable Modem.

17. A network-edge device comprising computer-readable media operable to be executed by the network edge device, and upon execution being configured to cause the network-edge device to:
establish connection and registration with devices on a first upstream channel;
determine whether each of a plurality of user devices is transmitting on the first upstream channel at a power level substantially its maximum output power level;
measure the received signal power of user devices that are transmitting at substantially their maximum output level at the network-edge device;
scan the characteristics of at least one other upstream channel;
select from the at least one other scanned upstream channels a second upstream channel that can accommodate upstream transmissions from the devices determined to be operating at substantially their respective maximum output power without adversely affecting upstream transmissions from user devices that are not operating substantially their maximum output power level;
send a channel change request from the network-edge device to user devices that are transmitting at a power level substantially their respective maximum upstream transmit power level that instructs the devices to tuning to the second upstream channel;
modify transmission characteristics of the first upstream channel to provide better service to user devices still transmitting over the first upstream channel.

18. The network-edge device of claim 17 wherein the characteristics of upstream channel includes the channel width, modulation profile and communications technology.

19. The network-edge device of claim 17 wherein the upstream channels considered III the scanning processes can be logical channels at same frequency of the first channel or physical channels at different frequency from that of the first channel.

20. The network-edge device of claim 17 wherein the measure of user devices transmitting power at the maximum limits is measured dynamically.

21. The network-edge device of claim 17 wherein the measure of user devices transmitting power at the maximum limits of measured per upstream channel.

22. The network-edge device of claim 17 wherein the better service can be higher throughput.

23. The network-edge device of claim 17 wherein the network-edge device is a Cable Modem Termination System.

24. The network-edge device of claim 17 wherein the user device is a Multimedia Terminal Adaptor or a Cable Modem.

* * * * *